United States Patent
Klee et al.

(10) Patent No.: US 6,637,412 B1
(45) Date of Patent: Oct. 28, 2003

(54) METHOD AND ARRANGEMENT FOR OPERATING AN INTERNAL COMBUSTION ENGINE

(75) Inventors: Peter Klee, Knittlingen (DE); Gholamabas Esteghlal, Darmstadt (DE); Gudrun Menrad, Stuttgart (DE); Andreas Pfender, Abstatt (DE); Hans Hillner, Karlsruhe (DE); Georg Mallebrein, Korntal-Muenchingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/913,282

(22) PCT Filed: Feb. 15, 2000

(86) PCT No.: PCT/DE00/00418

§ 371 (c)(1),
(2), (4) Date: Aug. 13, 2001

(87) PCT Pub. No.: WO00/49473

PCT Pub. Date: Aug. 24, 2000

(30) Foreign Application Priority Data

Feb. 16, 1999 (DE) .......................................... 199 06 376

(51) Int. Cl.[7] .............................................. F02M 51/00
(52) U.S. Cl. ..................... 123/478; 123/480; 701/102
(58) Field of Search ................................. 123/434, 435, 123/672, 676, 679, 478, 480; 701/102, 103, 104

(56) References Cited

U.S. PATENT DOCUMENTS

| | | | |
|---|---|---|---|
| 5,774,858 A | * | 6/1998 | Taubkin et al. .............. 704/273 |
| 5,930,993 A | * | 8/1999 | Kammann et al. ............ 60/274 |
| 6,456,917 B1 | * | 9/2002 | Gierling et al. ............... 701/51 |

FOREIGN PATENT DOCUMENTS

| | | |
|---|---|---|
| DE | 197 44 230 | 4/1999 |
| EP | 0533474 | 3/1993 |
| JP | 08 261032 | 10/1996 |
| WO | WO 97 13064 | 4/1997 |

* cited by examiner

Primary Examiner—John Kwon
(74) Attorney, Agent, or Firm—Walter Ottesen

(57) ABSTRACT

Method and arrangement for operating an internal combustion engine (10) which is operable in several operating modes, especially an internal combustion engine (10) having direct injection or intake manifold injection and having a control apparatus (11). The control apparatus (11), that is, its software has a plurality of functions (12) and a scheduler (13) for activating the functions (12). The executability of the functions (12) is determined in dependence upon the operating-mode dependent and operating-mode independent conditions and, with the aid of a bridging signal, the determination of the operating-mode dependent conditions can be disabled.

13 Claims, 5 Drawing Sheets

METHOD AND ARRANGEMENT FOR OPERATING AN INTERNAL COMBUSTION ENGINE

FIELD OF THE INVENTION

The invention relates to a method and an arrangement for operating an internal combustion engine, especially an internal combustion engine having direct injection or intake manifold injection and a control apparatus. The control apparatus, that is, its software, exhibits a plurality of functions and a scheduler to activate the functions.

BACKGROUND OF THE INVENTION

A control apparatus for a system and a method for operating a control apparatus are known from unpublished patent application DE 197,44 230 wherein the control apparatus has A function modules, a scheduler for activating the function modules and a priority administrator. The priority administrator assigns changeable priorities to the function modules and these priorities are considered by the scheduler during the activation of function modules.

SUMMARY OF THE INVENTION

The present invention has the object to improve a method of the generic type in such a manner that functions can be optimally activated in dependence upon the operating conditions of the internal combustion engine.

The object of the present invention is solved with the features of claim 1.

ADVANTAGES OF THE INVENTION

The especially substantial advantage of the present invention is that functions, which are not executable in the mode of operation currently set, can intervene actively in the operating mode coordination. Furthermore, it is achieved that functions can determine their executability independently of the mode of operation.

Additional advantages of the invention are apparent in combination with the dependent claims from the following description of the embodiments.

BRIEF DESCRIPTION OF THE DRAWINGS

Embodiments of the invention are shown in the drawing and are explained in greater detail in the description which follows.

DESCRIPTION OF THE PREFERRED EMBODIMENTS OF THE INVENTION

The present invention is described in greater detail in the following with respect to the example of an internal combustion engine having direct injection. However, this invention can also be applied for controlling any desired electromechanical system which can be equipped with a control arrangement.

Figure 1:
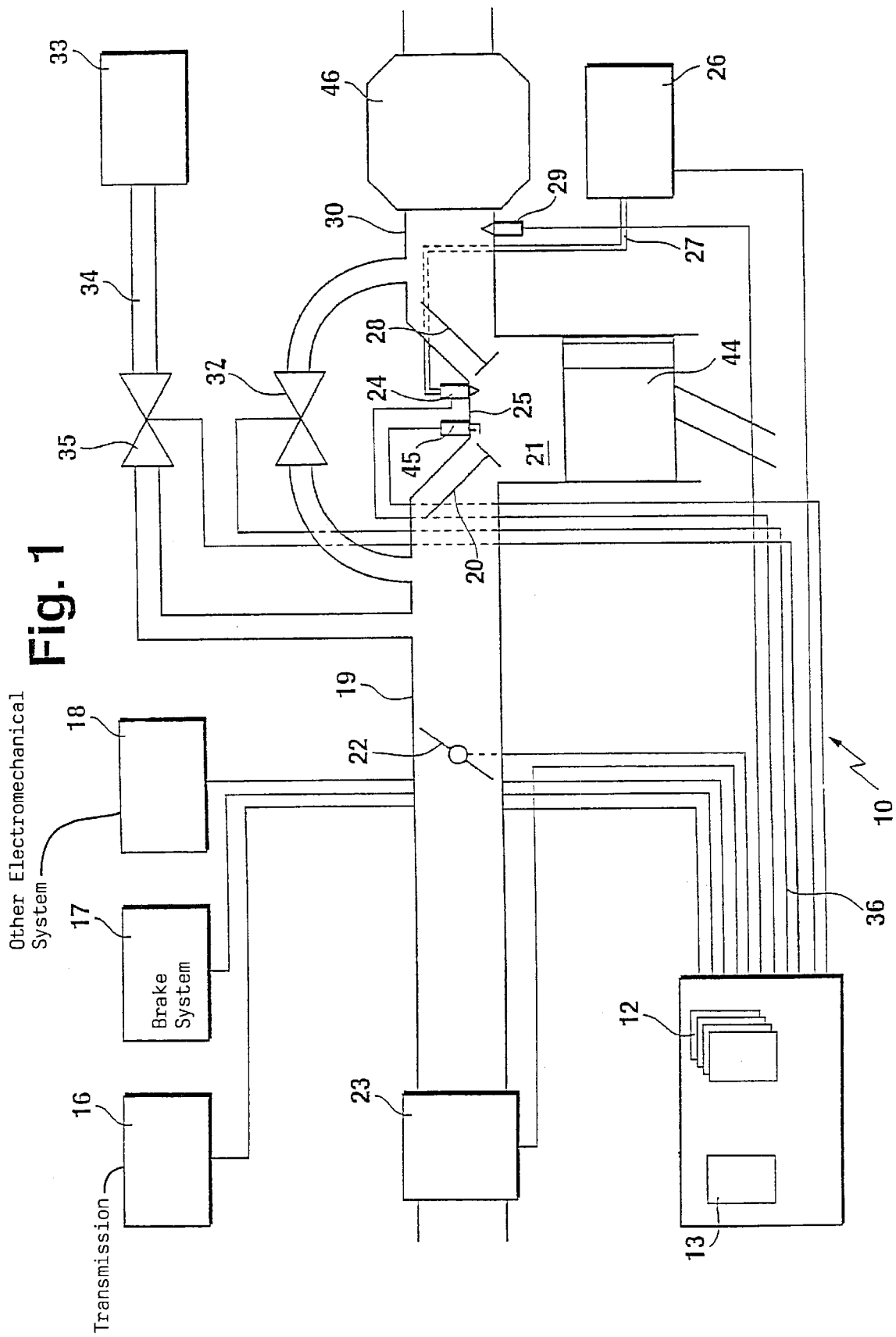
FIG. 1 schematically shows an internal combustion engine having a control apparatus.

As shown in FIG. 1, fresh air is supplied to a combustion chamber 21 in an internal combustion engine having direct injection by means of an intake manifold 19 via an inlet valve 20. The quantity of the fresh air supplied to the combustion chamber 21 can be controlled via a throttle flap 22. An air-quantity sensor 23 detects the fresh air flowing into the engine. An injection valve 24 and a spark plug 45 are mounted in the cylinder head 25. The fuel is brought to a working pressure utilizing a high pressure pump 26 and is injected into the combustion chamber 21 via a fuel line 27 and injection valves 24. The injected fuel is ignited with the aid of the spark plug 45. A piston 44 is driven by the expansion of the ignited fuel. Furthermore, the combustion chamber 21 includes an outlet valve 28 for discharging the exhaust gases arising during a combustion. The oxygen component in the exhaust gas can be measured by means of a broad band lambda probe (LSU) 29 in the exhaust-gas pipe 30 whereby the air/fuel ratio in the mixture can be determined. A catalytic converter 46 is mounted in the exhaust-gas pipe 30. The catalytic converter 46 has the task of converting toxic exhaust-gas components, such as CO, HC and NO into $CO_2$, $H_2O$ and $N_2$. An EGR line 31 connects the exhaust pipe 30 to the intake manifold 19 whereby exhaust gases from the exhaust pipe 30 are directed into the intake manifold 19 because of the higher pressure in the exhaust pipe 30. The exhaust-gas flow into the EGR line 31 can be controlled with the aid of the EGR valve 32. A tank-venting line 34 leads to the intake manifold 19 from a fuel tank or active charcoal vessel 33 whereby additional fuel can reach the intake manifold 19 and thereby also the combustion chamber 21. The fuel flow in the tank-venting line 34 can be controlled by a tank-venting valve 35. The control of the entire engine 10 takes place by means of a control apparatus 11. Furthermore, the control apparatus 11 controls a transmission 16, a brake system 17 and any desired additional electro-mechanical systems 18. The various sensors and actuators are connected to the control apparatus 11 via signal and control lines 36.

The control apparatus 11 includes a plurality of functions 12 and a scheduler 13. The scheduler 13 administers generally diagnostic functions and engine control functions 12 which have couplings with each other and are therefore not permitted to be executed simultaneously. An example of functions, which exhibit couplings with respect to each other, are the functions "tank venting" and "LSU diagnosis". The function "tank venting" functions to reduce the vapor emissions of the fuel and effects that fuel from the fuel tank and/or active charcoal vessel 33 reaches the intake manifold 19 and thereby the combustion chamber 21. The function "LSU-diagnosis" checks the operability of the broad band lambda probe (LSU) 29. However, for this purpose, defined conditions in the fuel supply and air supply of the engine 10 are necessary. If the function "tank venting" is activated during the LSU-diagnosis, then additional fuel flows into the combustion chamber 21 whereby the diagnosis conditions change (increased fuel supply) and the result of the diagnosis is made incorrect.

The engine 10 can be operated in various operating modes which differ from each other essentially by the injection time point and the ignition time point. With the aid of the control apparatus 11, a switchover can be made between the modes of operation of the engine 10. Operating modes of the engine 10 can be: the homogeneous operation HOM, the homogeneous lean operation HMM, the stratified operation SCH, the homogeneous stratified operation HOS and the stratified catalytic converter heating operation SKH.

In the homogeneous operation HOM, the fuel is injected by the injection valve 24 into the combustion chamber 21 during an induction phase caused by the piston movement. At the same time, air is inducted via the throttle flap 22 and the inlet valve 20. The inducted air swirls the fuel which therefore distributes approximately uniform or homogeneously in the combustion chamber. The air/fuel mixture is then compressed in order to be ignited by a spark plug 45. The ignited air/fuel mixture expands and drives the piston 44. In homogeneous operation, the arising torque is dependent essentially upon the position of the throttle flap 22. In order to achieve a high torque and a low development of toxic substance in the combustion, the air/fuel mixture is adjusted as close as possible to $\lambda=1$ or $<1$.

In the homogeneous lean operation HMM, the fuel is injected into the combustion chamber 21 during the induction phase as in the homogeneous operation. In contrast to the homogeneous operation, an air/fuel mixture is adjusted at $\lambda>1$.

The throttle flap 22 is generally wide open in stratified operation SCH. The fuel is injected into the immediate region of the spark plug 45 during the compression phase. Then, the fuel is ignited by the spark plug 45 and the piston 44 is driven by the subsequent expansion of the ignited fuel. In stratified operation, the arising torque is substantially dependent upon the injected fuel mass.

A double injection takes place in the homogeneous stratified operation HOS. Here, fuel is injected into the combustion chamber 21 during the induction phase and during the compression phase. The homogeneous stratified operation combines the characteristics of the homogeneous operation and the stratified operation. With the aid of the homogeneous operation, for example, an especially soft transition from the homogeneous operation to the stratified operation and vice versa from the stratified operation into the homogeneous operation is achieved.

A double injection also takes place in the operating mode "stratified catalytic converter heating SKH". The fuel is injected into the combustion chamber during the compression phase and during the work phase or during the compression phase and during the discharge phase. In this way, a rapid heating of the catalytic converter is effected and essentially no additional torque is generated. This mode of operation is, for example, of significance for the cold start of the engine 10.

The functions 12 can assume different statuses in the control apparatus 11. To provide a clearer overview and simpler illustration, the functions 12, which have the same status, are arranged in function lists. The following function lists result:

F-list 1: list of all functions in the control apparatus 11 which are to be administered;

F-list 2: list of the executable functions; and,

F-list 3: list of the activated functions.

Operating modes are assigned to the functions 12 in which these functions are permitted to be executed. If the incorrect operating mode is set, that is, an operating mode in which functions 12 are not permitted to be executed, then these functions 12 remain blocked until the operating mode is set to which they are assigned.

A series of conditions must be evaluated in order to determine the executability of a function 12. These conditions can be subdivided into operating-mode independent conditions and into operating-mode dependent conditions. The operating-mode independent conditions can be evaluated at any time. An example for conditions which do not change with a changeover into another operating mode (operating-mode independent conditions) are the engine speed nmot and the temperature tmot of the engine 10. The operating-mode dependent conditions can only be evaluated in the particular operating mode. An example of this is the intake manifold pressure ps.

Physical conditions can change because of the changeover from one operating mode of the engine 10 into another operating mode. For example, the intake manifold pressure is low in the operating mode "homogeneous HOM" at low loads because of the substantially closed throttle flap 22. In the operating mode "stratified SCH", the intake manifold pressure assumes a high value because of the essentially wide-opened throttle flap 22. This high value corresponds approximately to the atmospheric pressure.

Figure 2:
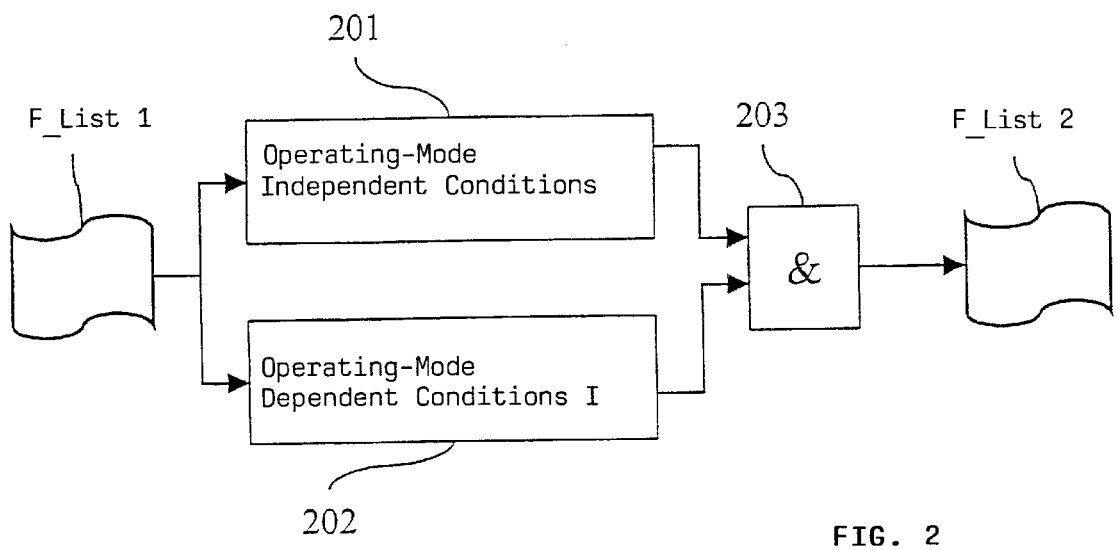
FIG. 2 schematically shows the method sequence for the determination of the executability of the functions.

To determine the executability of the functions 12, and as shown in FIG. 2, the input of block 201 for determining the operating-mode independent conditions and the input of block 202 for determining the operating-mode dependent conditions I are simultaneously charged from the function list F-list 1. The outputs of blocks 201 and 202 are applied to the input of a block AND logic element 203. At the output of block 203, a function list F-list 2 of the executable functions 12 is obtained.

In a block 201, a check is made for the functions of the F-list 1 as to whether the operating-mode independent conditions are satisfied. At the same time, a check is made in block 202 as to whether the operating-mode dependent conditions are satisfied. In step 203, the results of the steps 201 and 202 are logically coupled to each other with the aid of an AND logic element 203. As a result, a function list "F-list 2 of the executable functions" is obtained. The F-list 2 contains only those functions of the F-list 1 for which the operating-mode independent and operating-mode dependent conditions are satisfied.

The physical conditions of the engine 10 can be different in dependence upon the instantaneously adjusted operating mode. For this reason, the operating-mode dependent conditions are only satisfied for the functions 12 of the F-list 1 in general which are executable in the instantaneously adjusted operating mode. In an incorrect operating mode, that is, in an operating mode in which a function is not permitted to be executed, the executability for this function cannot be determined. The function remains blocked as long as no external influence compels by chance the correct operating mode.

Figure 3:
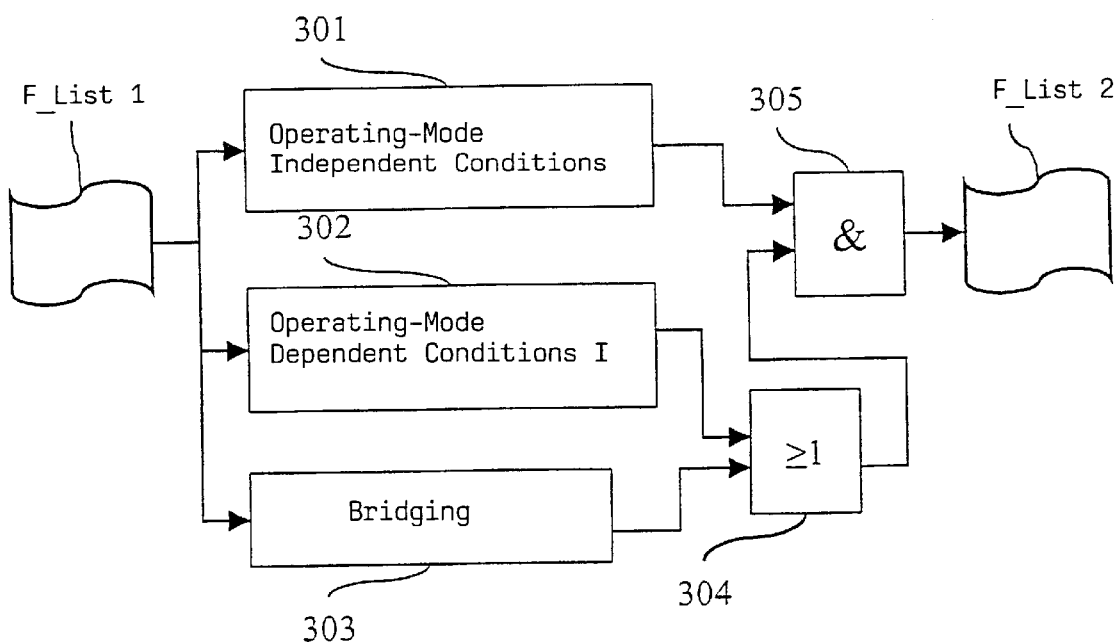
FIG. 3 schematically shows the method sequence of a method of the invention for determining the executability of the function and the operating-mode dependent conditions can be bridged in dependence upon operating conditions of the internal combustion engine.

The embodiment shown in FIG. 3 rectifies this problem. Here, an F-list 1 simultaneously charges the blocks "operating-mode independent conditions" 301, "operating-mode dependent conditions I" 302 and a block "bridging" 303. The outputs of the blocks "operating-mode dependent conditions I" 302 and "bridging" 303 charge the input of a block "OR logic element" 304. Furthermore, the outputs of the blocks "OR logic element" 304 and "operating-mode independent conditions" 301 charge the input of the block "AND logic element" 305. A function list F-list 2 of the executable functions 12 is obtained at the output of the block "AND logic element" 305.

As shown in FIG. 3, a function list "F-list 2 of the executable functions" is formed from a function list F-list 1 of all functions to be administered in the control apparatus 11. In block 301, a check is made for the functions of the F-list 1 as to whether the operating-mode independent conditions are satisfied. At the same time, in block 302, a check is made for the functions of the F-list 1 as to whether the operating-mode dependent conditions are satisfied. This takes place independently of whether the operating mode is set for the functions of the F-list 1 in which operating mode these functions are permitted to be executed or not. Furthermore, a check is made in block 303 as to whether a bridging signal is present. The block operating-mode dependent conditions 302 is quasi switched out with the aid of a bridging signal. In this way, the executability of the functions is determined only in dependence upon the operating-mode independent conditions 301.

A bridging signal can, for example, be generated globally, that is, for all functions 12, for example, at regular time intervals and in dependence upon specific occurrences, states or operating conditions of the engine. Also, several bridging signals can exist which are fixedly allocated to respective specific functions 12 or which are allocated to the functions 12 dynamically in dependence upon the operating conditions of the engine.

This embodiment defines an expansion of the embodiment shown in FIG. 2. Here, functions 12, which cannot be executed in the currently set operating mode and for which therefore no check can be made as to whether the operating-mode dependent conditions are satisfied, can also be set to be executable. A condition precedent for this is that the operating-mode independent conditions are satisfied. The functions 12, which require a bridging of the operating-mode dependent conditions, are only set to be executable to a limited extent, that is, they are only set "executable for test purposes".

Figure 4:
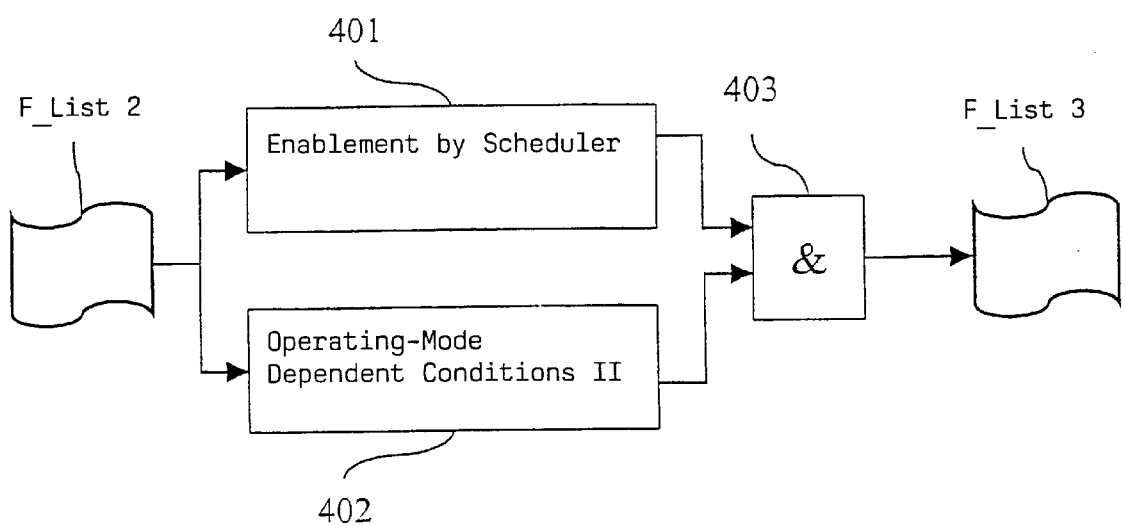
FIG. 4 schematically shows the method sequence of a method of the invention for activating the executable functions; and, FIG. 5 shows a sequence diagram of the method of the invention.

As shown in FIG. 4, a function list F-list 2 of the executable functions 12 simultaneously acts on the inputs of block "operating-mode dependent conditions II" 402 and the block "enable scheduler" 401. The outputs of the blocks 401 and 402 charge the input of a block "AND logic element" 403. At the output of the block 403, the function list F-list 3 of the activated functions is obtained.

In FIG. 4, the functions from the function list "F-list 2", that is, of the list of functions which had been set as executable or were only set to be executable for test purposes, are activated. For this purpose, a selection method is executed in the scheduler 13 in step 401. In this selection method, the functions are selected from the function list "F-list 2" which are simultaneously executable. Furthermore, that operating mode is selected in which the selected functions 12 may be executed. When no further demands are present, the control apparatus 11 switches the engine 10 into the selected operating mode. After the switchover into the operating mode has taken place in which the selected functions are permitted to be executed, the selected functions are enabled for activation by the scheduler 13. In block 402, a check is made for the functions 12 of the F-list 2 as to whether the operating-mode dependent conditions are satisfied.

The functions 12, which had been set to be only executable for test purposes because the operating mode in which they are permitted to be executed was not set, a check can now be made for the second time in step 402 (assuming the correct operating mode is now set) as to whether the operating-mode dependent conditions are satisfied. If the operating-mode dependent conditions of these functions are not satisfied, then the executability of these functions is again withdrawn.

If the functions 12 in block 401 are enabled by the scheduler 13 for activation and the operating-mode dependent conditions II in block 402 are satisfied, then the selected functions 12 are activated in block 403.

The embodiments of FIGS. 3 and 4 are shown together in a flowchart in FIG. 5.

Figure 5A:
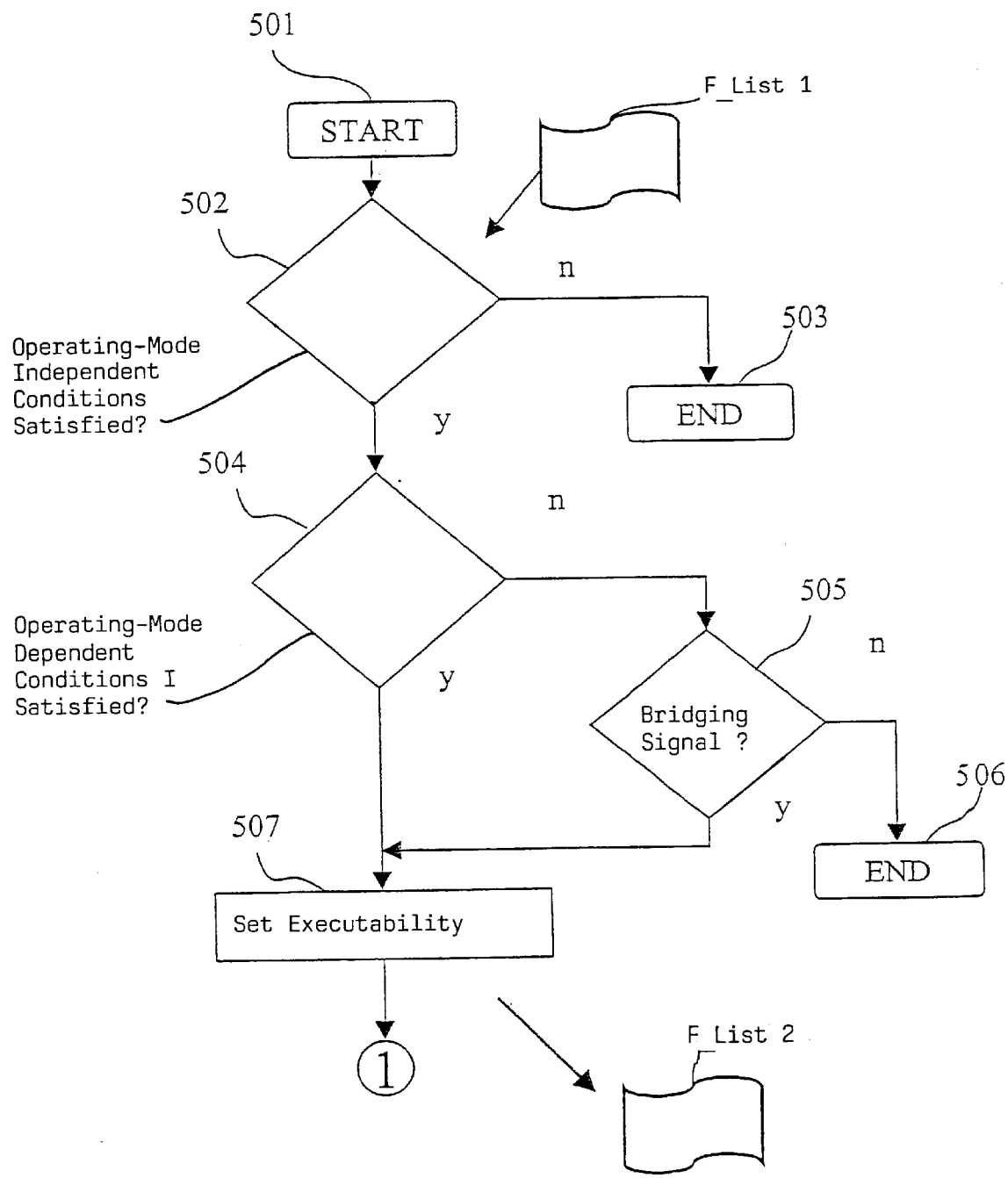
Figure 5B:
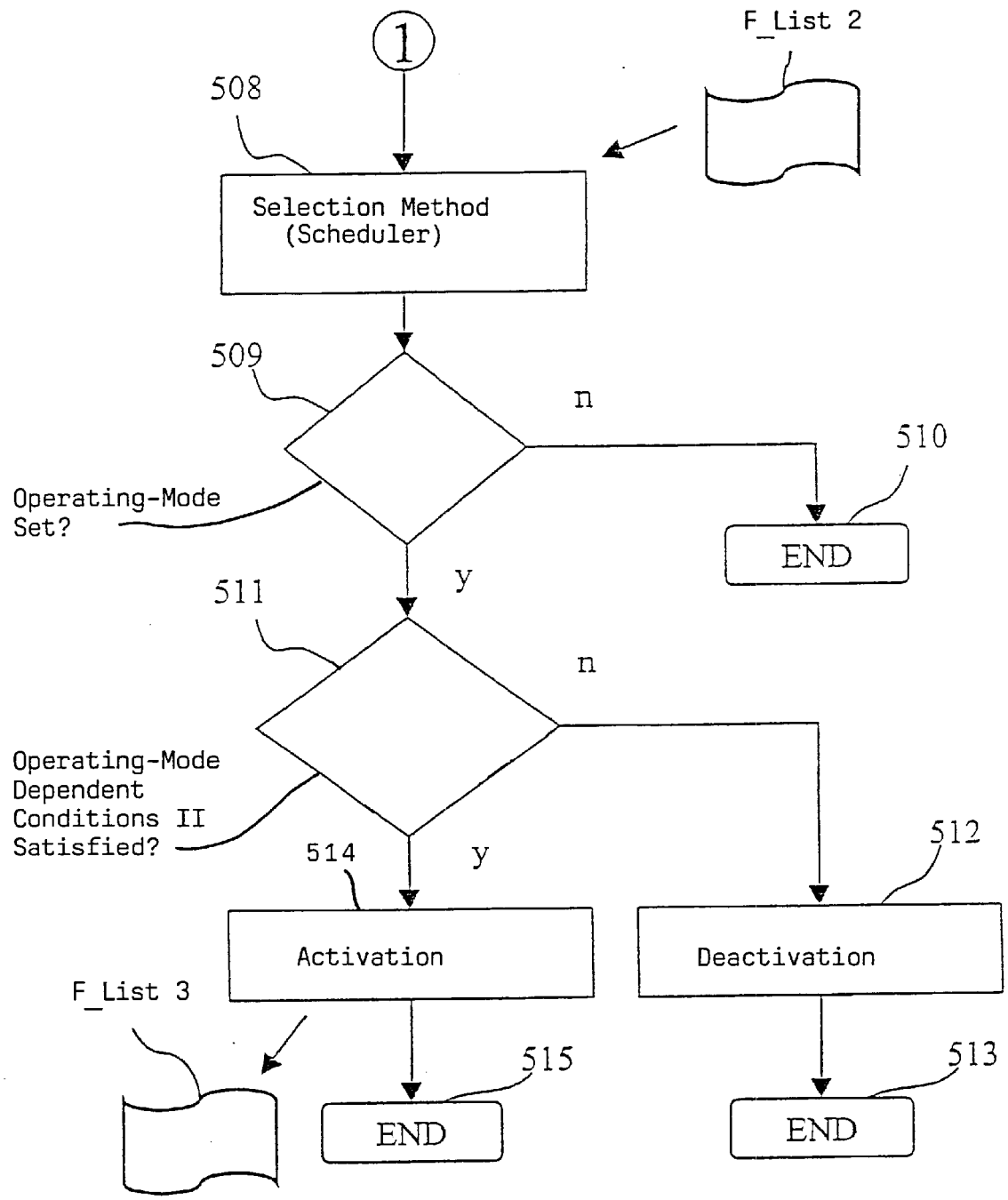

FIG. 5*a* shows the first part and FIG. 5*b* shows the second part of the method. FIGS. 5*a* and 5*b* are to be viewed together and flow one into the other.

After a start of the method in step 501, a check is made in step 502 for each function of the F-list 1 as to whether the operating-mode independent conditions are satisfied. If the operating-mode independent conditions are not satisfied, then the method is ended for this function in step 503. If, in contrast, the operating-mode independent conditions are satisfied, then a check is made in step 504 for the first time as to whether the operating-mode dependent conditions for this function are satisfied. If the operating-mode dependent conditions are satisfied, then the function is set to be executable in step 507. If the operating-mode dependent conditions for this function are not satisfied, then a check is made in step 505 as to whether this function is not permitted to be executed in the currently set operating mode and whether a bridging signal is present. If no bridging signal for this function is present or if this function is executable in the currently set mode, then the method for this function is ended in step 506. If a bridging signal for this function is present and if the currently set operating mode is an operating mode wherein this function is not permitted to be executed, then this function is set to be executed for test purposes in step 507. If the described steps are applied to all functions of the F-list 1, then a function list F-list 2 of the executable functions is obtained.

Alternatively to the above-described step 505, also only a check can be made as to whether a bridging signal is present for the function. There is no check made as to whether the function is permitted to be executed in the currently set operating mode. In lieu thereof, it is ensured that a bridging signal can only be present for a function when the operating mode assigned to the function is not set. For this purpose, one bridging signal is needed for each operating mode.

The functions of the F-list 2 participate in a selection method in the scheduler 13 in step 508. In the selection method in step 508, the functions of the F-list 2 are selected which are simultaneously executable and, furthermore, an operating mode is selected wherein these selected functions are permitted to be executed. If the selected operating mode cannot be set by the control apparatus 11, then the method is ended in step 510. If, in contrast, the selected operating mode is set, then a check is made for each of the functions 12 for a second time in step 511 as to whether the operating-mode dependent conditions are satisfied. If the operating-mode dependent conditions for a function 12 are not satisfied, then the executability is withdrawn in step 512 and the method for these functions is ended in step 513. If the operating-mode dependent conditions for this function are, in contrast, satisfied, this function is activated in step 514. As a result, a function list "F-list 3 of the activated functions 12" is obtained. The method is ended in step 515.

What is claimed is:

1. A method for operating an internal combustion engine including an engine having direct injection or intake manifold injection, the engine having a control apparatus, the control apparatus having software providing a plurality of functions, the method comprising the steps of:

setting said functions to be executable in dependence upon operating conditions of said engine;

operating said engine in at least two operating modes thereof;

setting said functions to be executable in dependence upon operating-mode dependent and operating-mode independent conditions of said engine; and, setting said functions to be executable in dependence upon the operating-mode independent conditions of said engine when predetermined operating conditions of said engine occur.

2. The method of claim 1, wherein the functions, which are not permitted to be executed in the currently set operating mode and whose operating-mode independent conditions are satisfied, are set to be executable.

3. The method of claim 1, comprising the further step of generating a global bridging signal for the occurrence of predetermined operating states of the engine.

4. The method of claim 3, comprising the further step of triggering said bridging signal in dependence upon the executability of said functions.

5. The method of claim 3, comprising the further step of triggering said bridging signal at predetermined time points.

6. The method of claim 3, comprising the further step of generating a plurality of bridging signals at different time points and assigning one of said bridging signals to at least one of said functions.

7. The method of claim 6, comprising the further step of assigning an operating mode to each of said bridging signal and generating a bridging signal only when the assigned operating mode is set.

8. The method of claim 6, wherein the bridging signals are fixedly allocated or are allocated dynamically to the functions in dependence upon the operating conditions of the engine.

9. The method of claim 1, wherein said functions define at least one of: diagnostic functions, engine control functions and operating modes of the engine.

10. The method of claim 1, wherein the method is applied in one of the following: a transmission, brake system and electro-mechanical system.

11. A method for operating an internal combustion engine including an engine having direct injection or intake manifold injection, the engine having a control apparatus, the control apparatus having software providing a plurality of functions, the method comprising the steps of:

setting said functions to be executable in dependence upon operating conditions of said engine;

operating said engine in at least two operating modes thereof;

setting said functions to be executable in dependence upon operating-mode dependent and operating-mode independent conditions of said engine; and, wherein executable functions, which are enabled for activation, are only then activated when their operating-mode dependent conditions are satisfied and that the executability of these functions is withdrawn when the operating-mode dependent conditions are not satisfied.

12. The method of claim 11, wherein a pregiven time duration is available for checking the operating-mode dependent conditions.

13. A control apparatus for operating an internal combustion engine having direct injection or intake manifold injection and the control apparatus having a memory including a read-only-memory (ROM) and a computer apparatus including a microprocessor, the control apparatus comprising a program stored on the memory which is suitable for execution on said computing apparatus and for carrying out a method for operating an internal combustion engine having direct injection or intake manifold injection, the control apparatus having software providing a plurality of functions and the method including the steps of:

setting said functions to executable in dependence upon operating conditions of said engine;

operating said engine in at least two operating modes thereof;

setting said functions to be executable in dependence upon operating-mode dependent and operating-mode independent conditions of said engine; and, setting said functions to be executable in dependence upon the operating-mode independent conditions of said engine when predetermined operating conditions of said engine occur.

* * * * *